Patented Nov. 20, 1923.

1,474,381

UNITED STATES PATENT OFFICE.

ELMER DONALD ROGERS, OF DETROIT, MICHIGAN.

DESICCATED MALT EXTRACT AND METHOD OF PRODUCING THE SAME.

No Drawing. Application filed April 16, 1919, Serial No. 290,583. Renewed April 2, 1923.

*To all whom it may concern:*

Be it known that I, ELMER DONALD ROGERS, a citizen of the United States, residing at Detroit, county of Wayne, State of Michigan, have invented a certain new and useful Improvement in Desiccated Malt Extracts and Methods of Producing the Same, and declare the following to be a full, clear, and exact description of the same, such as will enable others skilled in the art to which it pertains to make and use the same, reference being had to the accompanying drawings, which form a part of this specification.

The object of this invention is to secure a new product—namely, a readily soluble desiccated malt extract and the method of producing the same and in which no detrimental chemical change has taken place in the process of production, the substantially dry product retaining all of the active properties of the original solids of the malt so that upon the addition of a proper volume of water a malt extract in the original form and containing all of its original properties may be produced. In securing the solids of the extract in the dry form the product may be preserved indefinitely and at any time utilized in the same manner as the original extract.

Malt extract contains practically all the constituents of the grain from which it is produced made soluble by the mashing process due to the action of the malt enzymes, diastase, and the soluble compounds produced by the action of the diastase on the starch of the grain—namely, crystalline sugar, maltose, and the substances known as maltodextrins, and the object of this invention is to produce a product in which all of these constituent solids of malt extract are reduced to a dry form in the process of production of which the solubility is not impaired and in which the active properties of solids are chemically unchanged, the product being of a quality to again, by the addition of proper quantity of water, produce an extract having all the qualities of the original extract.

This new desiccated product may be produced through use of the well known apparatus now utilized in desiccation of milk and other products but preferably, the process is as follows, the method described being one that has been found efficient and productive of the full desired result.

The original malt extract from which my new product is obtained is the usual malt extract or "sweet malt" syrup commonly in use by brewers and is made in the usual manner commonly in use. This extract is condensed in a vacuum at a temperature of about 120 to 130 degrees F. for which purpose the usual vacuum pan used in the condensing of the milk is serviceable. Condensation is preferably continued until the liquid is approximately fifty per cent of total solids. This condensed extract is then taken from the pan and cooled at approximately sixty degrees F. The cooled condensed liquid is then sprayed into a current of heated air in any of the well known forms of spraying apparatus particularly as shown in U. S. patent to Charles E. Rogers, No. 1,243,878 of October 23, 1917. The spray room, in desiccation of malt extract, may be maintained at a temperature of practically 175 degrees F. without injury to the product as the rapid evaporation of the moisture carrying the solids is sufficient to prevent an overheating thereof. The condensed fluid in being sprayed in the form of a mist into the heated current of air, the moisture is rapidly evaporated and the practically dry solids containing less than three per cent moisture fall to the floor of the drying chamber from which the dry solids may be taken and packaged in any approved manner preferably from the atmosphere. The product is in a finely divided form like a powder, contains all the active qualities of the original extract in an unimpaired or physical state enabling the desiccated product to be utilized in the reproduction of the original extract and may be utilized in the same manner and for the same purpose as the original extract.

Having thus briefly described my invention, what I claim is—

1. The herein described product, the solids of malt extract in the form of a practically dry powder and having practically full diastatic power of the original extract.

2. The herein described product, the solids of diastatic malt extract in the form of a powder having practically the full diastatic power of the original extract and containing not more than two per cent of moisture.

3. The herein described product, the solids of malt extract in the form of a practically dry powder with practically the full diastatic power of the original extract and freely soluble in water.

4. As a new article of manufacture, a malt extract powder containing practically as great an amount of diastase as the original extract in unimpaired chemical state, containing less than two per cent of moisture and being freely soluble in water.

5. The method of producing desiccated malt extract having practically full diastatic power consisting in condensing the extract at a temperature not to exceed 130 degrees F., then immediately cooling the liquid to substantially sixty degrees F., and then immediately spraying the cooled liquid into a current or air having a temperature of approximately 175 degrees F.

6. The method of producing desiccated malt extract with practically unimpaired diastase content consisting in first preparing the extract in a known manner, then condensing the extract in a vacuum at a temperature of not greater than 130 degrees F., until the liquid contains practically fifty per cent of solids, immediately cooling the liquid to substantially sixty degrees F., and then immediately spraying the liquid into a current of air having a temperature of approximately 175 degrees F., to remove the greater percentage of the remaining moisture.

In testimony whereof, I sign this specification.

ELMER DONALD ROGERS.